No. 632,721. Patented Sept. 12, 1899.
F. G. JOHNSON.
PULVERIZING MILL.
(Application filed Jan. 17, 1899.)
(No Model.) 3 Sheets—Sheet 2.

WITNESSES:

INVENTOR
Frank G. Johnson

No. 632,721. Patented Sept. 12, 1899.
F. G. JOHNSON.
PULVERIZING MILL.
(Application filed Jan. 17, 1899.)
(No Model.) 3 Sheets—Sheet 3.

WITNESSES: F. R. Johnson, M. Johnson.

INVENTOR Frank G. Johnson

UNITED STATES PATENT OFFICE.

FRANK G. JOHNSON, OF NEW YORK, N. Y.

PULVERIZING-MILL.

SPECIFICATION forming part of Letters Patent No. 632,721, dated September 12, 1899.

Application filed January 17, 1899. Serial No. 702,481. (No model.)

*To all whom it may concern:*

Be it known that I, FRANK G. JOHNSON, a citizen of the United States, residing at New York, (Port Richmond,) in the county of Richmond, State of New York, have invented a new and useful Pulverizing-Mill, of which the following is a specification.

The leading use of my invention is the pulverizing to a powdered form of a variety of substances, particularly various ores, lime, plaster, cements, sand, &c.; and my special aim is to combine the actions of crushing and rubbing and by such contrivance as to perform the work rapidly and with economy of power, and as far as it is possible in such mills to prevent wear and breakage of the mill, and to this end especially to dispense with roller-shafts, journal-bearings, and journal boxes and sleeves, and all other parts liable to rapid wear and disarrangement.

The nature of my invention is that of a combined centrifugal and gravity roller-mill, in which I employ two series of rollers coupled together two by two in a peculiar manner and rotated on annular dies or other hardened surfaces.

I may here state that though horizontal-roller mills admit of the application of centrifugal force, yet they have none of the advantages of the force of gravitation, but all the disadvantages of the latter force, chiefly the difficulty of supporting the weight of the rollers and rapid-running roller-shafts and the entire weight of the revolving portion of the mill on shaft-steps, while with vertical-roller mills other disadvantages are encountered—viz., the force of gravity acting only downward prevents uniformity of action of the centrifugal force, besides causing the material to fall at the bottom of the pulverizing-chamber, where the rollers must act on more of the material than they do in the upper part of the said chamber, whereas in my device I utilize both the force of gravity and centrifugal force in a way to avail myself of the advantages of both said forces and avoid all the said disadvantages.

Without giving further general description of my invention I will proceed at once to give a detailed specification of its construction and show how I successfully attain my objects and overcome the usual objections to this class of pulverizing-machines.

Figure 1:
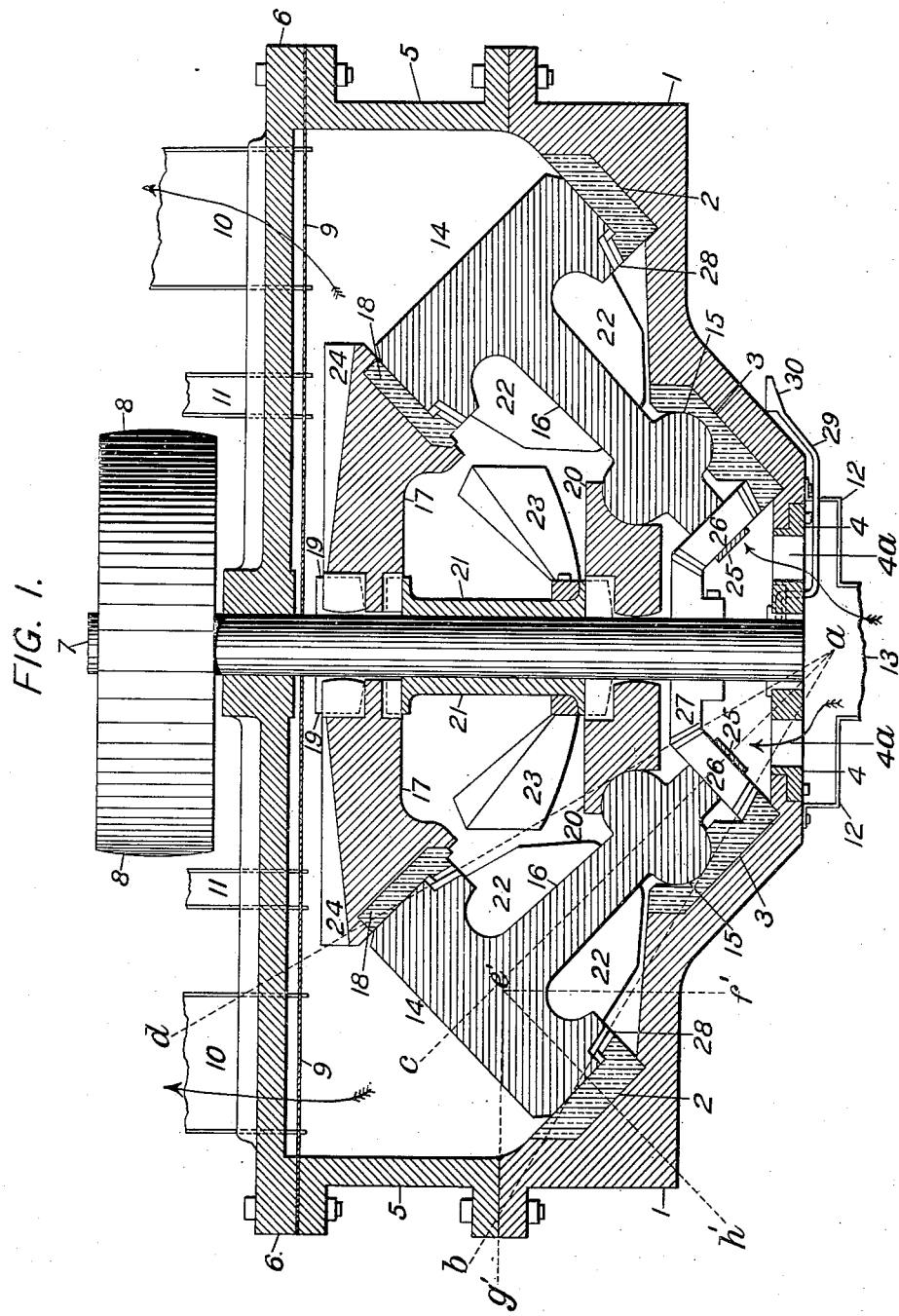
Figure 2:
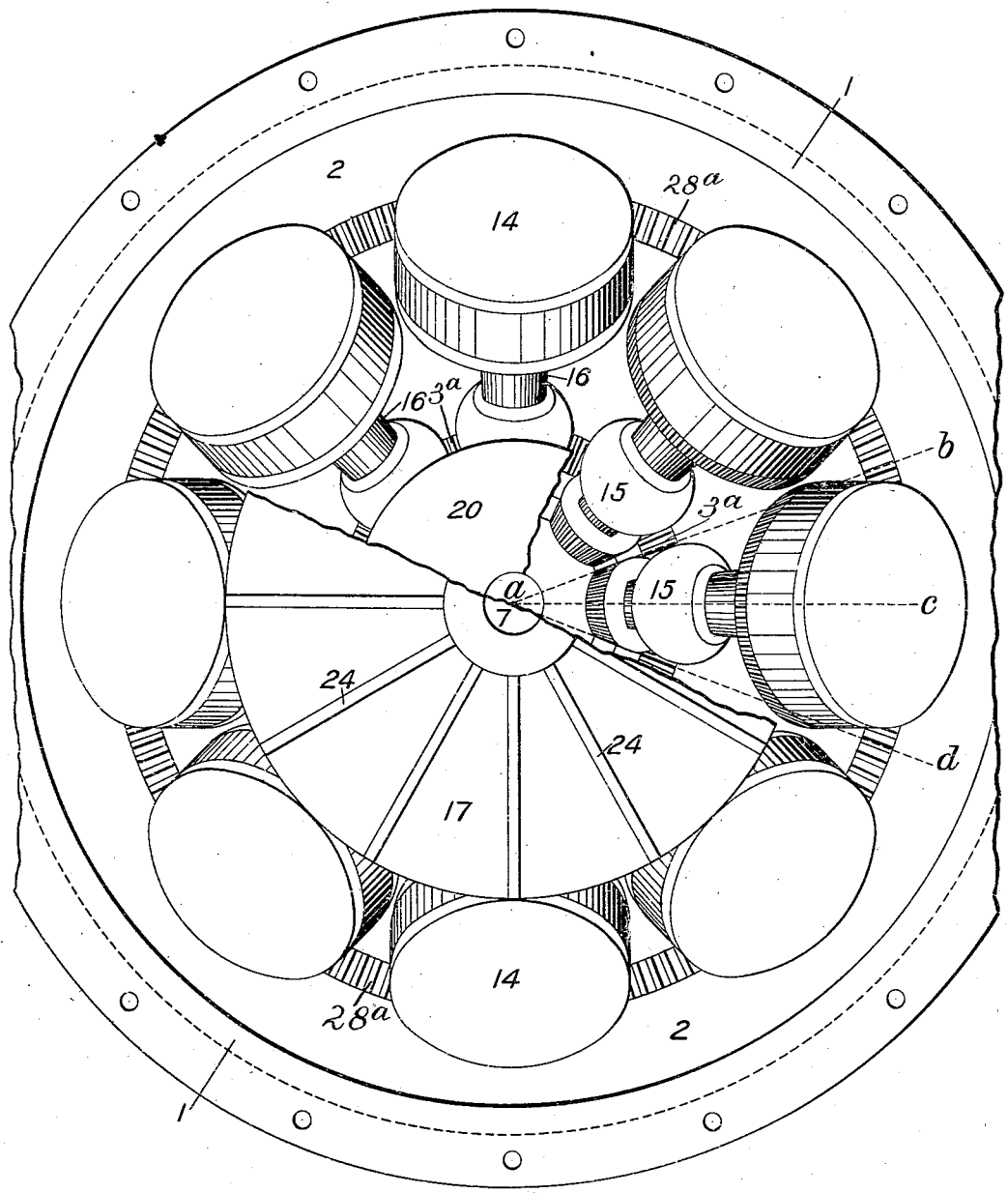
Figure 3:
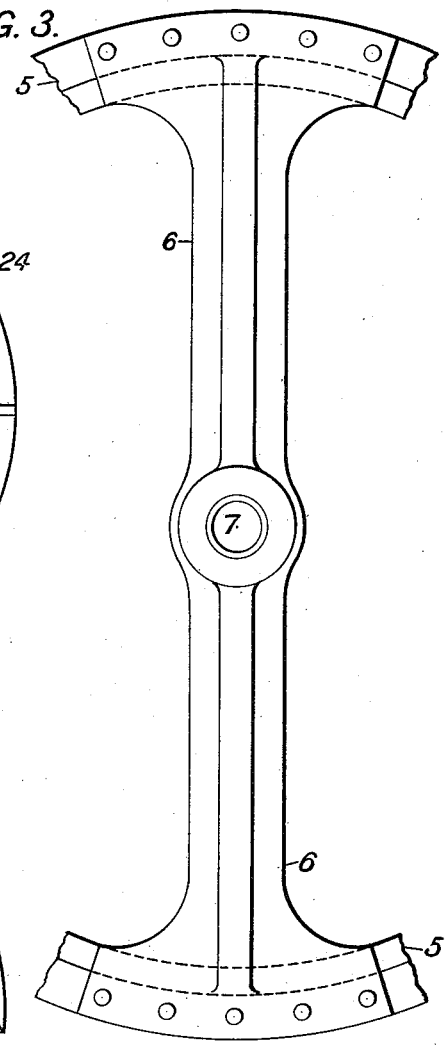
Figure 4:
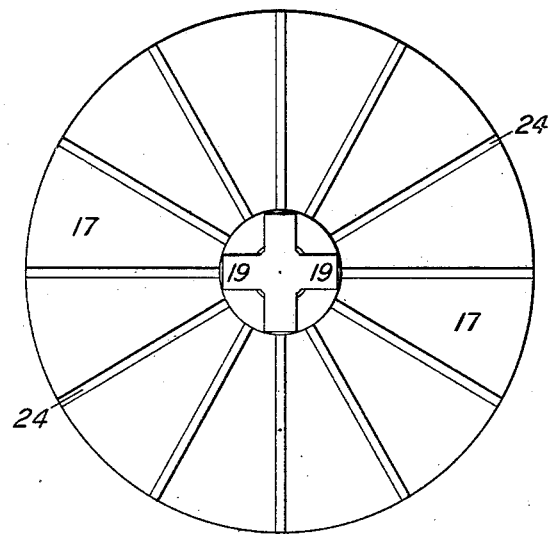
Figure 5:
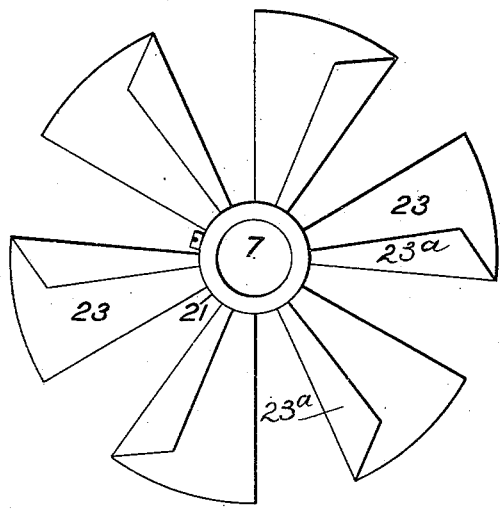
Figure 6:
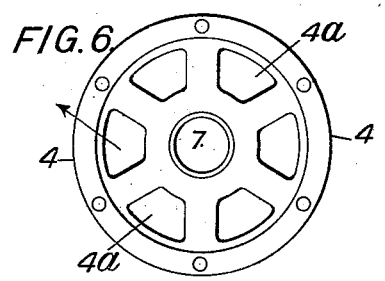

Figure 1 is a vertical section of the mill cutting opposite rollers and other parts through their centers, except the motor-shaft and driving-pulley, which are shown in the round; Fig. 2, a top plan view with the cover of the case and part of the two motor-plates removed, exposing to view the relative position of the two series of rollers; Fig. 3, a top plan view of the cross-head which horizontally holds and in which revolves the upper end of the motor-shaft; Fig. 4, a top plan view of the upper motor-plate, showing radial blades for scattering the feed of the material to be pulverized and the method of connecting the said plate with the motor-shaft; Fig. 5, a top plan view of a rotary fan-wheel, the peculiar form and function of which will be hereinafter explained; and Fig. 6, a top plan view of a more or less open plate bolted to and constituting a part of the bottom of the inclosing case to admit of an upward current of air through the mill.

Similar numerals and letters of designation refer to similar parts throughout the several views.

Numerals 1 and 5 designate the case, which for convenience of handling is made in two parts and in the lower part of which is held the annular dies 2 and 3, on which the rollers travel; 4, a detachable circular plate that forms the lowermost part of the inclosing case, having the additional functions of horizontally holding the lower end of the motor-shaft and serving to admit a current of air through its openings 4ª up through the mill and as a manhole to facilitate access to the interior of the mill; 5, the upper portion of the case, on the top of which is bolted the cross-head 6, which horizontally holds and in which revolves the motor-shaft 7; 8, the driving-pulley; 9, a metal-plate cover of the case; 10 10, large piped apertures in the said cover, through which the material is drawn off by suction as fast as it becomes sufficiently reduced; 11 11, piped apertures through which the material to be pulverized is fed to the mill; 12, a sheet-metal cap covering the removable plate 4 and its openings, into which, by a suitable fan-blower, is driven a blast of air through its receiving-pipe 13; 14 14, a series of rollers; 15 15, another series of rollers of less diameter and of different form; 16 16, shanks that join together two by two these different sized and formed rollers, which I will term "roller-shanks." I say "shanks" instead of "shafts" for the reason that they (the shanks) and each of the two rollers coupled together are preferably cast of steel and constitute one piece, and they (the shanks) have no journals or journal-boxes and are not employed to propel the rollers, and therefore they are not in any view shafts. The outer rollers having a straight-line contact with the base on which they travel, I will term them the "flat-faced" rollers and the inner series the "spheroidal" rollers. By referring to the converging lines $a\ b$ and $a\ d$ it will be seen that the two series of rollers travel around on their respective treadways with different velocity, but make a circuit around the common center of motion and revolve on their own centers in the same time.

17 is a motor-plate for propelling the flat-faced rollers, upon the tops of which its weight is carried, being a casting of some three thousand pounds in a mill of ordinary size; 18, an annular steel die set in the bearing-surface of the said plate; 19, a clutch-joint between the motor-shaft 7 and the said motor-plate 17, (see Fig. 4,) so arranged that the said motor-plate can slightly rock and be free to rest and bear upon the tops of the said rollers. This upper motor-plate will also rotate the spheroidal rollers, as they (the two series of rollers) are rigidly connected together.

20 is a holding-plate, which may be made also a motor-plate by connecting it with the upper plate 17, preferably made of steel, though it can be made of chilled iron, which rests and bears upon the tops of the spheroidal rollers 15, whereby these two plates are made to act conjointly on both sets of rollers, thereby providing for the application to the rollers of ample motive power to give the mill strong and steady action. As a means of applying the motive power to this holding motor-plate 20 and be able to conveniently put the parts of the mill together I provide the coupling-sleeve 21, which is free to slide up and down on the motor-shaft and is rotated by the upper motor-plate 17, and this sleeve at the bottom has a clutch connection with and rotates the lower motor-plate 20, and which in its clutch connection is also provided for a slight rocking motion, the said sleeve serving to couple together the two motor-plates. This lower plate, as above stated, may be employed only as a holding-plate to keep the two series of rollers in place against the centrifugal force; but I prefer to use it also as a motor-plate by connecting it with the motor-shaft by means above described.

22 are blades or wings which are cast on the roller-shanks 16, there being three or more on each shank, which I will term "shank-blades," that serve to throw the material after it passes under the flat-faced rollers diagonally upward toward the center of the pulverizing-chamber.

Fig. 3 represents a peculiar fan-wheel mounted on and rotated by the sleeve 21. This fan-wheel consists of blades, as shown in Fig. 1, pointing diagonally upward and outward, and the face of the blades pointing diagonally downward and about a third portion of each blade $23^a$ at its back edge turned upward at right angles to the other portion thereof, which forms an angle in the blades pointing diagonally upward and outward, whereby the material thrown toward these blades by the shank-blades 22 is collected and thrown diagonally upward and outward in the direction of the contact between the top of the flat-faced rollers and the upper motor-plate 17, whence the fine particles of the material are drawn through the discharge-openings 10 10, and the coarser particles that are not caught and crushed between the said rollers and said motor-plate again fall under the bottom of the said rollers. Thus it will be seen this fan-wheel, in conjunction with the shank-blades 22, performs a vital function by circulating and throwing the material after it first passes under the flat-faced rollers to the top of said rollers and so again to the bottom thereof, which perpetually feeds the material to both the tops and bottoms of said rollers.

24 are narrow radial blades cast on the upper face of the upper motor-plate 17, (see Figs. 1 and 4,) which (as the material fed to the mill falls on this plate) throws the material in all directions radially outward against the upper walls of the case, whence it uniformly falls directly under the flat-faced rollers, and thereby is fed alike to each of said rollers.

On the stems 25 of the said roller-shanks, which extend downward from the spheroidal rollers, is provided miter gear-wheels 26, which mesh with the miter gear-wheel 27, that is mounted on and rotated by the motor-shaft 7 and with the rack of corresponding teeth $3^a$ on the annular die 3. On the inner rim of the flat-faced rollers are provided bevel-teeth 28, that mesh into a corresponding bevel-rack $28^a$ on the annular steel die 2, Fig. 2, and also into a corresponding bevel-rack provided on the annular die 18. The bevel of the teeth in the miter-gears corresponds to the converging lines $a\ b$ and $a\ d$; but the tread-faces of the rollers and their treadways do not converge with these lines and for reasons hereinafter given. The roller-shanks stand at an angle of forty-five degrees of upward divergency from the horizontal plane, and the rollers, being at right angles to their shanks, stand at an angle of forty-five degrees with the said plane and the central motor-shaft. Each of the flat-faced rollers has its tread-face across its dies in straight lines lying parallel to the central line of its shanks. The greatest diameter of the spheroidal rollers is equal to the space between the converging lines $a\ b$ and $a\ d$ at the point of their location on the shaft-shanks 16. These rollers travel in an annular channel in the annular steel die 3 and are propelled by the lower steel motor-plate 20, which also has an annular channel that conforms to the said rollers. Of course both motor-plates act in conjunction in propelling the two series of rollers, as above stated. The function of these spheroidal rollers is twofold, one of which is to hold the flat-faced rollers in their angular position to the motor-shaft and the other to perform no inconsiderable part of the pulverizing. The inner rollers being spheroidal and revolving or traveling in corresponding channels are secured in their own position, and thereby secure the outer rollers in their position against displacement radially outward by centrifugal force or radially inward by force of gravity. It is to be understood that the object of the miter-gears is not to propel the rollers, as this is performed by the two motor-plates acting on the top of the same, the said gears being employed to hold the rollers in radial alinement until the mill attains sufficient velocity to maintain such alinement by centrifugal force.

I will now explain the general operation of my invention and point out some of its advantages.

Referring to Fig. 1, the dotted lines $e\ f$ and $e'\ f'$ represent the direction of the force of gravity and the dotted lines $e\ g$ and $e'\ g'$ the direction of the centrifugal force. Consequently the resultant of these two forces will be in the direction of the dotted lines $e\ h$ and $e'\ h'$, which is perpendicular to the tread-face of both series of rollers and the face of the treadways of their respective annular dies 2 and 3—that is, provided these two forces are equal—and they can be made approximately equal by suiting the velocity of the mill to the combined weight of the rollers, their shanks, motor-plates, and motor-shaft. This desirable and important result of throwing the force of gravity of all the rotating parts of the mill and the centrifugal force of the rollers and their shanks on the dies in a perpendicular direction to the face of the rollers and their treadways is accomplished by placing the shanks of the rollers at an angle as nearly as possible forty-five degrees divergent from the motor-shaft which rotates the rollers, and this result is attained in proportion as the said shanks approximate the said position of forty-five degrees of divergency. The importance of this feature of my invention is shown by referring to the application of the same principle for another purpose. Railroad-engineers elevate the outer rail on curves of the road to relieve the horizontal strain of centrifugal force between the flange of the wheels and the track, whereby the said force is more or less converted from a horizontal to vertical direction. It will be seen that the line of contact between the flat-faced rollers and their annular dies does not fall on the dotted converging lines $a\ b$ and $a\ d$. Consequently there is a torsion or some slipping action between the said rollers and said dies. There is also a slipping action between the outer surface of the spheroidal rollers and their channelled die. The amount of this slipping action between the rollers and dies is what is required, especially for fine pulverizing. The resultant force of the forces of gravity and centrifugal force on the spheroidal rollers (indicated by the line $e'\ h'$) being lower than the center of gravity of the outer rollers will counteract any tendency of the centrifugal force to outwardly overturn the outer rollers, which permits the mill to be safely and economically run with great velocity. By a blast of air forced through the apertures $4^a$ in the detachable plate, Fig. 6, at the bottom of the case, or by an induced current of air through the mill caused by suction applied at the discharge-apertures 10 10 at the top of the mill, as indicated by the arrows, the material is taken out of the mill through the said discharge-apertures as rapidly as it becomes sufficiently reduced to be carried by the said current. The stronger the current of air the coarser will be the material discharged, and vice versa.

It will be seen that I have dispensed with bolts and journals needing lubrication and all such complications in the interior of the mill as are liable to become disarranged; that I employ no shafting, journals, or journal-boxes, except the main motor-shaft, which can be readily oiled and is not submitted to extraordinary strain; that I have greatly multiplied pulverizing-surfaces by the employment of sixteen rollers, which act upon the material both at the top and bottom; that the centrifugal force is uniformly applied and not varied by the force of gravity, as is the case with vertical-roller mills, and have avoided the objections of horizontal-roller mills—namely, the difficulty of sustaining the weight of the rollers on vertical shafts and keeping such shafts lubricated.

I do not necessarily employ steel dies, as I find chilled iron at its reduced cost is sometimes quite as desirable.

What I claim as new and useful, and desire to secure by Letters Patent, is—

1. In a pulverizing-mill a series of flat-faced rollers and a series of spheroidal rollers connected together two by two by intervening shanks having a series of fan-blades thereon in combination with a flat-faced motor-plate fitted to rest upon and rotate the said flat-faced rollers and a channel motor-plate fitted to rest upon and rotate the said spheroidal rollers, in combination with an annular flat-faced treadway an annular channel-treadway a vertical motor-shaft and an inclosing case.

2. In a pulverizing-mill, a series of flat-faced rollers and a series of spheroidal rollers rigidly coupled together two by two by intervening shanks said shanks having the position of forty-five degrees upward divergency from the horizontal plane, the said flat-faced rollers having an annular treadway and a motor-plate fitted to revolve on and rotate said rollers, said motor-plate having vertical radial feeding-blades on the top face thereof, the said spheroidal rollers having an annular channel-treadway and a motor-plate having an annular channel fitted to revolve on and hold the said spheroidal rollers in the said channel-treadway, in combination with a central motor-shaft and a suitable inclosing case.

3. In a pulverizing-mill, a series of flat-faced rollers and a series of spheroidal rollers rigidly coupled together two by two by intervening shanks said shanks having forty-five degrees upward divergency from the horizontal plane, the said flat-faced rollers having an annular treadway and a motor-plate fitted to revolve on and rotate said rollers, the said spheroidal rollers having an annular channel-treadway and a motor-plate having an annular channel fitted to revolve on and rotate the said spheroidal rollers, in combination with steel dies, a central motor-shaft and a suitable inclosing case.

4. In a pulverizing-mill, a series of flat-faced rollers and a series of spheroidal rollers rigidly coupled together two by two by intervening shanks, said shanks having forty-five degrees upward divergency from the horizontal plane, the said flat-faced rollers having an annular treadway and a motor-plate fitted to revolve on and rotate said rollers, the said spheroidal rollers having an annular channel-treadway and a motor-plate having an annular channel fitted to revolve on and rotate the said spheroidal rollers, the said motor-plates having a coupling-sleeve between them and a clutch connection therewith whereby the said motor-plates have a conjoint action upon the said two series of rollers, in combination with steel dies a central motor-shaft and a suitable inclosing case.

5. In a pulverizing-mill, a series of flat-faced rollers and a series of spheroidal rollers rigidly coupled together two by two by intervening shanks having forty-five degrees upward divergency from the horizontal plane and having a series of radial blades, the said flat-faced rollers having an annular treadway and a motor-plate fitted to revolve on and rotate the said rollers and the said spheroidal rollers having an annular channel-treadway and a motor-plate having an annular channel fitted to revolve on and rotate the said spheroidal rollers, said two motor-plates being coupled together by clutch connection with an intervening sleeve having mounted thereon a fan-wheel having a series of diagonally upward extending wings turned at right angles upon themselves, in combination with steel dies, a central motor-shaft and a suitable inclosing case.

FRANK G. JOHNSON.

Witnesses:
F. R. JOHNSON,
M. JOHNSON.